United States Patent [19]
Winfrey

[11] 3,807,659
[45] Apr. 30, 1974

[54] LASER PROTECTION MECHANISM

[75] Inventor: Richard C. Winfrey, Ventura, Calif.

[73] Assignee: The United States of America as represented by the Secretary of the Army, Washington, D.C.

[22] Filed: June 16, 1972

[21] Appl. No.: 263,485

[52] U.S. Cl............... 244/3.16, 350/269, 350/273, 350/274
[51] Int. Cl.......... G02f 1/30, G02f 1/16, G02f 1/00
[58] Field of Search .......... 244/3.16; 350/269, 273, 350/274

[56] References Cited
UNITED STATES PATENTS

| | | | |
|---|---|---|---|
| 2,538,769 | 1/1951 | Drake | 350/274 |
| 3,370,503 | 2/1968 | Keahl | 350/273 |
| 3,566,354 | 2/1971 | French | 350/274 |

*Primary Examiner*—Samuel Feinberg
*Attorney, Agent, or Firm*—Edward J. Kelly; Herbert Berl; Charles R. Carter

[57] ABSTRACT

A mechanism for use with a missile director sight to protect an operator's eye from feedback effects of laser energy at the time of missile firing. The mechanism includes means for causing a shutter blade to periodically obscure the visual optical path. The use of this mechanism provides a smooth running shutter with a minimum of flicker and light loss.

4 Claims, 3 Drawing Figures

PATENTED APR 30 1974  3,807,659
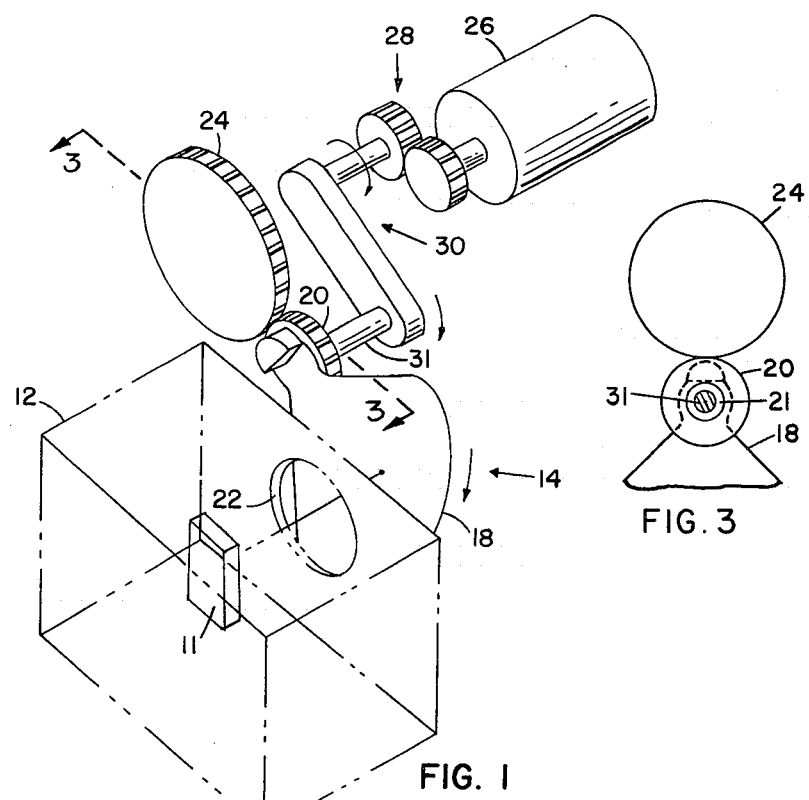
FIG. 3
FIG. 1
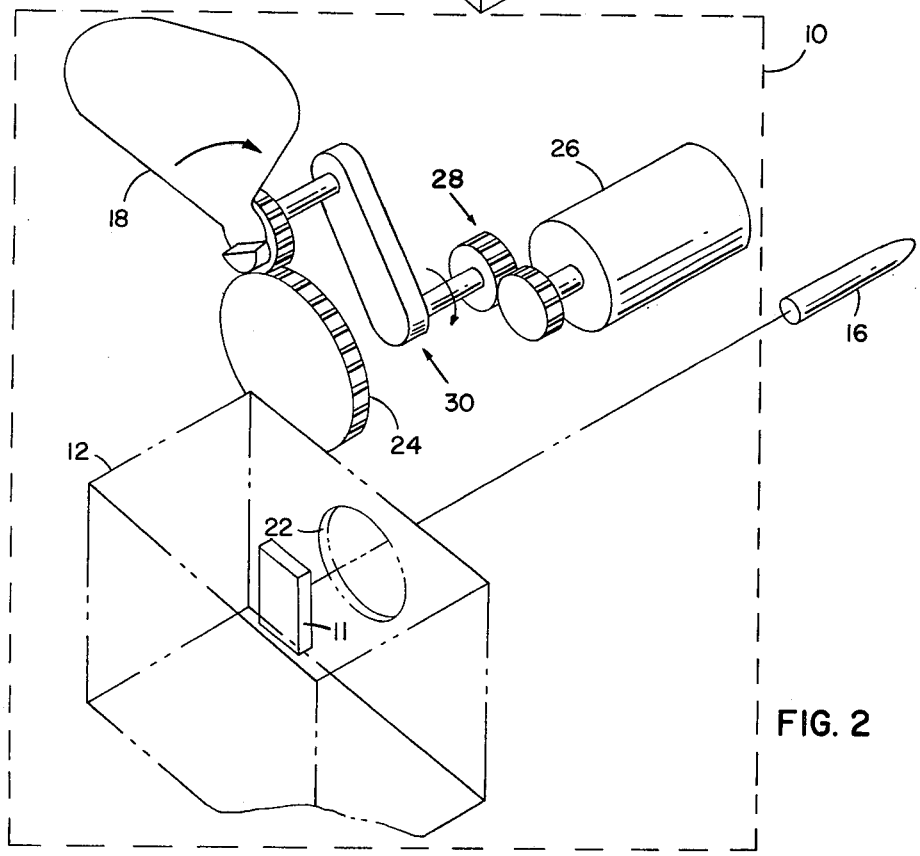
FIG. 2

LASER PROTECTION MECHANISM

BACKGROUND OF THE INVENTION

This invention relates to the field of laser guided missiles and more particularly to means for protecting the operator's eye from the harmful feedback effects of a laser beam. Previous mechanisms used have had problems of bothersome flicker, vibration and marginal operation due to excessive flicker and large loss of light.

SUMMARY OF THE INVENTION

The present invention has solved these problems by the use of a mechanism including a shutter blade having optimum rotational speed provided by a planetary gear rotating around a stationary sun gear. The mechanism reduces the time for the shutter blade to visually control an optical path which provides a feedback path for laser energy. By proper gear ratio selection the speed of the shutter can be controlled to result in a minimum of flicker along with a low level of vibration and maximum operation.

This invention may be better understood from the following detailed description taken in conjunction with the accompanying drawing.

BRIEF DESCRIPTION OF THE DRAWINGS

FIG. 1 is a perspective view showing the laser protection mechanism with the shutter blade blocking the visual optical path.

FIG. 2 shows the laser protection mechanism uncovering the visual optical path.

FIG. 3 is a view along line 3—3 of FIG. 1, showing the mounting of the planetary gear.

DESCRIPTION OF THE PREFERRED EMBODIMENT

Reference numeral 10 identifies a missile guidance director including a laser energy source 11 enclosed in a housing 12 and a laser protection mechanism generally indicated as 14 for obscuring a path from the source to a missile 16. The mechanism includes a shutter blade 18 fixedly connected to a planetary gear 20 for periodically covering an aperature 22 of the housing. Planetary gear 20 meshes with a non-rotating sun gear 24 and is caused to rotate around the sun gear by a drive motor 26. The motor operates through transfer gears 28 and planet carrier 30 causing planetary gear 20 to rotate around the sun gear since gear 20 freely rotates on a bearing 21 that is carried by the planet carrier shaft 31. When the planet carrier moves, shaft 31 carries gear 20 around the non-rotating sun gear 24. The mating of the teeth of gears 20 and 24 control the speed of the shutter blade 18. As the planetary gear rotates it brings the shutter blade into an aperature closing position for a specified period of time and thereafter the blade moves to open the aperature. The shutter mechanism runs continuously, is dynamically balanced, and as such has a low level of vibration as compared to a high vibration level caused by stop and start shutter mechanisms.

The aperature is completely covered once every two revolutions of the planetary carrier because of a non-integral gear ratio (4.5:1). If the shutter blade is initially covering the aperature as shown in FIG. 1, it will have rotated 4½ times when the planetary carrier has made one revolution. Hence, the planetary gear will be in the same position as shown in FIG. 1 but the shutter blade will now be rotated 180° from the position as in FIG. 1 and will thus provide a clear aperature. The use of a planetary gear not only reduces the time for the shutter to close and open, but also permits, by proper selection of gear ratio, a shutter speed which provides a near minimum of flicker since the shutter rotates at 9 times the obscuration repetition rate. In addition the mechanism does not increase the obscuration repetition rate and has a low level of vibration. An optimum gear ratio occurs. If a lower ratio is used, the shutter moves too slowly, thus increasing the flicker. If a higher ratio is used, the shutter blade will not have moved far enough around the sun gear before the shutter has made one revolution, and will thus partially obscure the aperture, again increasing the flicker. Therefore an optimum gear ratio exists between the above two extremes.

I claim:

1. A laser protection mechanism for use in a missile system comprising: a missile director having a source of energy for control of said missile, said source being provided with an aperture to provide a path for linking said energy with said missile; means for eliminating feedback of said energy into an operator's eye during missile firing, and mechanism for moving said means past said aperture at a speed which provides optimum obscuration repetition rate.

2. The mechanism as set forth in claim 1 wherein said means for eliminating feedback includes a shutter blade to cover said aperture and obscure said linking path for a specified length of time and a planetary gear train connection between said shutter blade and said moving mechanism.

3. The mechanism as set forth in claim 2 wherein said moving mechanism comprises: a drive motor, said planetary gear train and transfer gears connected between said drive motor to said planetary gear train whereby by proper selection of gear ratio produces a shutter speed with a near minimum of flicker.

4. The mechanism as set forth in claim 3 wherein said source of energy produces a laser beam.

* * * * *